United States Patent [19]

Clark

[11] Patent Number: 4,848,271
[45] Date of Patent: Jul. 18, 1989

[54] FLUX APPLYING APPARATUS

[75] Inventor: Clair D. Clark, Louisville, Ky.

[73] Assignee: General Electric Company, Louisville, Ky.

[21] Appl. No.: 219,991

[22] Filed: Jul. 6, 1988

[51] Int. Cl.$^4$ .............................................. B05C 1/00
[52] U.S. Cl. ................................... 118/668; 118/675; 118/676; 118/679; 118/683; 118/300; 118/400
[58] Field of Search ............... 118/668, 679, 675, 300, 118/500, 420, 400, 680, 681, 683, 676

[56] References Cited

U.S. PATENT DOCUMENTS

| | | | |
|---|---|---|---|
| 3,155,545 | 11/1964 | Rocks et al. | 118/621 |
| 3,175,247 | 3/1965 | Morrison et al. | 18/13 |
| 3,306,310 | 2/1967 | Grant | 134/122 |
| 3,334,639 | 8/1967 | Grant | 134/122 |
| 3,409,030 | 11/1968 | Schmidt | 134/123 |
| 3,439,649 | 4/1969 | Probst et al. | 118/634 |
| 3,463,363 | 8/1969 | Zelna | 222/334 |
| 3,741,155 | 6/1973 | Hunder | 118/634 |
| 4,151,016 | 4/1979 | Lee | 148/24 |
| 4,178,876 | 12/1979 | Nicklas et al. | 118/681 |
| 4,308,819 | 1/1982 | Hart | 118/307 |
| 4,309,456 | 1/1982 | Lock | 427/209 |
| 4,433,639 | 2/1984 | Brown | 118/316 |
| 4,766,844 | 8/1988 | Brewer et al. | 118/668 |

Primary Examiner—Willard Hoag
Attorney, Agent, or Firm—Frederick P. Weidner; Radford M. Reams

[57] ABSTRACT

Apparatus to apply brazing flux to a joint between two vertically oriented parts. A reservoir containing liquid brazing flux is in liquid flow communication with a pump capable of metering a fixed amount of flux when actuated. A nozzle in liquid flow communication with the pump has a housing with an outer casing and an inner casing spaced from the outer casing to form a passageway. The inner casing is open at one end to receive the parts to be joined and has two spaced apart opposing side walls with ports in each side wall in liquid flow communication with passageway. The nozzle and parts are moved relative to each other to position the joint between the two parts adjacent the ports in the side walls of the inner casing. Actuation of the pump will deliver the fixed amount of liquid brazing flux to the joint.

7 Claims, 2 Drawing Sheets

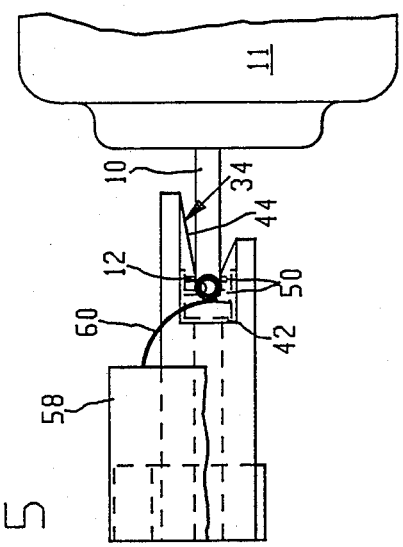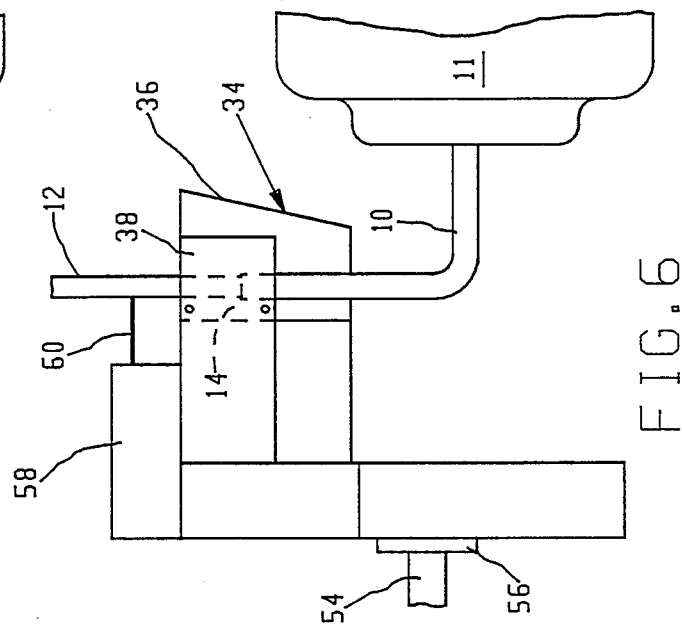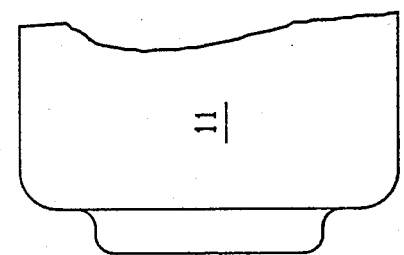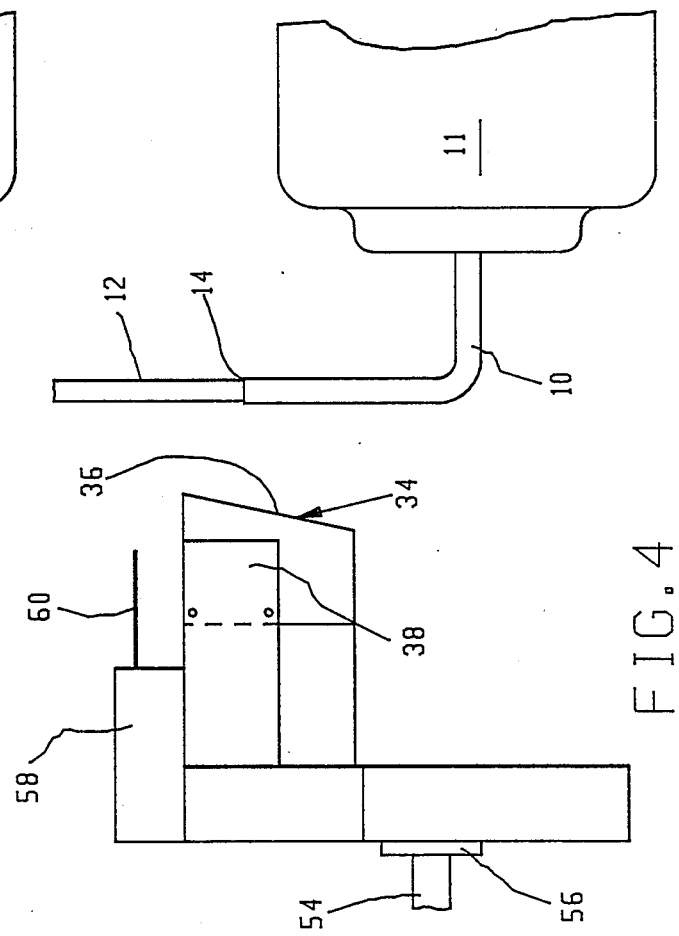

FLUX APPLYING APPARATUS

BACKGROUND OF THE INVENTION

Brazing two metal parts together such as two tubes, one telescoped inside the other, is accomplished by heating the area of the joint between the two tubes usually by a flame from ignition of a gas/oxygen mixture and introducing a braze alloy to the area to be joined, causing the alloy to melt and form around the area to be joined. With removal of the heat the alloy will solidify and seal the joint between the two tubes. Such brazing processes have been used particularly in sealing metal tubes such as copper to steel in hermetic sealed refrigerant systems used in refrigerators and air conditioners. Because the refrigerant system is to be hermetically sealed, each of the joints must be leakproof, which requires a high quality brazing operation. In order that the surfaces to be joined will accept the brazing alloy readily, they must be free from oxide or other obstructing films. When necessary, the parts are cleaned chemically or by abrasion. It is common in many brazing operations to apply a chemical flux to the joint prior to heating the joint to prepare the surface during the heating stage so that the braze alloy will thoroughly wet the joint area and produce a good sealed joint.

One of the problems encountered in applying brazing flux to metal parts such as two metal tubes that are vertically oriented is the lack of sufficient gravitational force to distribute the flux completely around the joint which is necessary to assure a high quality brazing operation. This is particularly so when the flux is applied in an automated brazing operation which takes place on an assembly line where the flux is to be applied to the two metal tubes by automated equipment and it is not desirable to orient the tubes horizontally. Heretofore, the flux was applied by a brush being dipped into liquid flux and then dabbed onto the joint. In many cases, however, the flux would not completely cover the circumference of the joint. The brush flux application also suffers from not having a fixed amount of flux applied to the joint to assure adequate coverage.

By this invention there is provided apparatus to apply brazing flux to a joint between two vertically oriented parts which will assure that the flux covers the circumference of the joint and that a correct fixed amount of flux will be applied to the joint.

SUMMARY OF THE INVENTION

There is provided apparatus to apply brazing flux to a joint between two vertically oriented parts including a reservoir containing liquid brazing flux which is in liquid flow communication with a pump having means to meter the amount of flux pumped when actuated. A nozzle in liquid flow communication with the pump has a housing with an outer casing and an inner casing spaced from the outer casing to form a passageway. The inner casing is open at one end to receive therein the tubes to be joined and has two spaced apart opposing side walls with ports in each side wall in liquid flow communication with the passageway. Means are provided to move the nozzle and parts relative to each other to position the joint between the two parts adjacent the ports in the side walls of the casing. Means are provided to actuate the pump and deliver a metered amount of liquid brazing flux to the joint.

BRIEF DESCRIPTION OF THE DRAWINGS

With reference to the accompanying drawing,

FIG. 3 is a top plan view of the nozzle of the flux applying apparatus of the present invention prior to being in position to apply the flux.

FIG. 4 is similar to FIG. 3 but shown in side elevation view.

FIG. 5 is a top plan view of the nozzle of the flux applying apparatus according to the present invention wherein the parts are in position to have flux applied.

FIG. 6 is similar to FIG. 5 but shown in side elevation view.

DESCRIPTION OF THE PREFERRED EMBODIMENT

Figure 1:
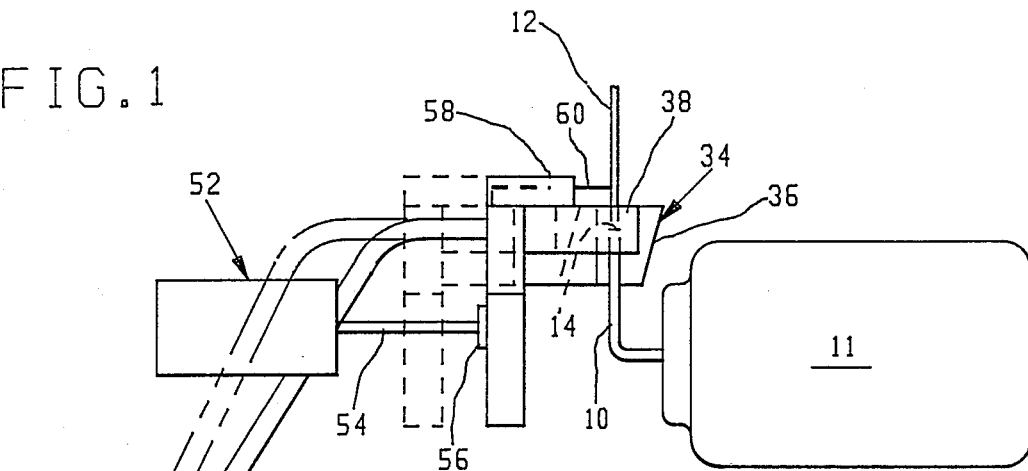
FIG. 1 is a schematic diagram of the flux applying apparatus of the present invention.

With reference to FIG. 1 of the accompanying drawing, there is shown diagramatically the automated flux applying apparatus in accordance with the present invention. The flux applying apparatus is used for applying liquid flux in a brazing operation for joining two vertically oriented metal parts together such as a first tube 10 and a second tube 12 which in the case of the preferred embodiment is utilized in a refrigeration system that includes a compressor 11. The joined metal tubes are to be assembled in a hermetic refrigeration system. The second tube 12 has a smaller diameter than tube 10 and is telescoped inside tube 10. These two tubes are to be joined together to form a joint 14 by a brazing operation wherein heat as by a flame from ignition of a gas/oxygen mixture is applied to the joint and brazing alloy is introduced to the joint where it melts and wets the surface around the joint and with removal of the heat the brazing alloy solidifies, thereby sealing the joint. In brazing operations, particularly when the two parts are of dissimilar metal such as copper and steel, it is desirable to apply a chemical flux to the joint prior to heating the joint so that the heating operation in conjunction with the flux will prepare the joint by cleaning and eliminating any surface film that would prevent a high quality joint. This is particularly important where the joint must be leak proof because it is used in a hermetically sealed refrigerant system.

Figure 2:
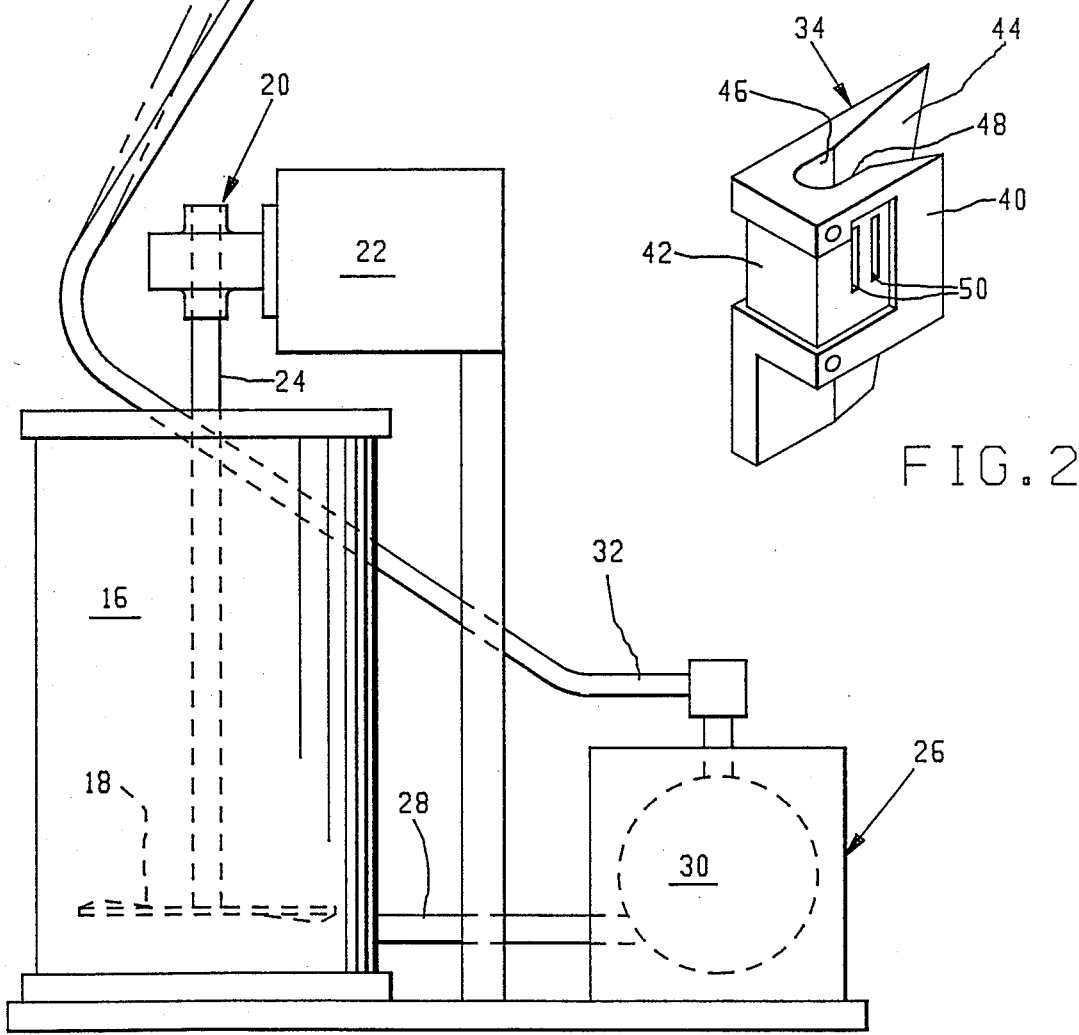
FIG. 2 is a perspective view of the nozzle of the flux applying apparatus of the present invention.

In an automated brazing operation including the flux applying apparatus of the present invention, the compressor 11 carrying with it vertically oriented first tube 10 and second tube 12 telescoped in the first tube 10 is moved to the flux applying station on an assembly line. In the preferred embodiment this is accomplished by a movable pallet that holds the compressor in a precise fixed horizontal position while tubes 10 and 12 are vertically oriented and is moved down a conveyor line to the flux applying station. As in this case it is often undesirable to try and orient the parts to be brazed together on the horizontal so that upon application of the flux on top of the joint gravitational force will cause the flux to flow down and around the joint. This invention is directed to flux applying apparatus that will apply flux to a joint between two vertically oriented metal parts, that is, their orientation relative to a horizontal plane is such that gravitational force will be insufficient to assure complete circumferential coverage of the joint with the flux. The flux applying apparatus shown in FIG. 1 is located at the station and includes a reservoir 16 which contains a liquid brazing flux commercially available and commonly used for brazing operations. One such flux is sold by Handy and Herman Company located at 850 Third Avenue, New York, N.Y. 10022. In the preferred embodiment the reservoir 16 is cylindrically shaped and has a stirring paddle 18 inside the reservoir which is rotated by a mechanism generally indicated as 20 driven by an electric motor 22 and connected to stirring paddle 18 by a shaft 24. A pump 26 is in fluid flow communication with the reservoir 16 by a conduit 28 exiting the bottom portion of the reservoir 16 and entering the pump chamber 30. In the preferred embodiment the pump 26 is a positive displacement type, that is, every time the pump is actuated a fixed amount of flux is pumped out of the pump 26 into conduit 32. The fixed amount desired can be adjusted by adjusting the displacement of the pump. One such pump is model 115 sold by Liquid Metronics, Inc., Action, Mass. 01720. Other types of pumps may be utilized, such as centrifugal pump which may be controlled by a solenoid, as long as th pump will deliver a measured or metered amount of flux into conduit 32. The measured amount of flux is determined by the amount desired to adequately cover the joint, yet not too much that it has excessive run off. The end of conduit 32 opposite from the pump 26 is connected to nozzle 34 so that the nozzle is in liquid flow communication with the pump. The nozzle has a housing 36 which includes an outer casing 38 (FIG. 1) and an inner casing 40 (FIG. 2) which is spaced from the outer casing to form a passageway 42 between the inner and outer casings. The inner casing 40 is open at one end 44 to receive the tubes 10 and 12 and the joint 14. The inner casing 40 has two spaced apart opposing side walls 46 and 48 with ports 50 in each side wall in liquid flow communication with the passageway 42.

Means are provided to move the nozzle 34 and tubes 10 and 12 relative to each other to position the joint 14 between the two tubes adjacent the ports 50 in the side walls 46 and 48 of the inner casing 40. In the preferred embodiment the nozzle is moved as shown in FIG. 1 from a first position shown in phantom line to a second position shown in full line. A pneumatic air cylinder 52 with a piston rod 54 having its end 56 attached to the nozzle 34 is arranged for back and forth movement within the cylinder housing 58 by pneumatic drive means.

There is provided detector means to detect the presence of absence of one of the tubes to be joined and in the preferred embodiment the detector means is a microswitch 58 mounted on top of the nozzle 34 which may be actuated by a feeler wire 60. When the nozzle 34 is moved into flux applying position as shown in full line in FIG. 1 and in FIGS. 5 and 6, the feeler wire 60 contacts tube 12 thereby indicating that tube 12 is in fact in position and that the flux applying process should proceed. If tube 12 is absent, it is not desirable to have the flux applying operation take place as the flux would flow downwardly into tube 10 and detrimentally affect the hermetic system including the compressor 11. When the detector means detects the presence of tube 12, then control means responsive to the detector means will actuate the pump 26 and a measured amount of flux will be pumped from the pump 26 through conduit 32 into nozzle 34 and through passageway 42 to ports 50 whereupon the flux is deposited onto the joint 14. It will be noted particularly in FIG. 5 that the ports 50 in one side wall 46 or 48 are opposite the ports 50 in the other side wall. It will also be noted that the ports in side walls 46 and 48 are spaced a distance slightly less than the diameter of the joint 14 between the two tubes 10 and 12. With the positioning of the ports as described, the delivery of the flux through the ports 50 will surround the tubes 10 and 12 at the joint 14 and the correct measured amount of flux will assure complete circumferential coverage of the joint. The thickness of the flux should be such that it won't spray or drip too much when applied to the joint 14 but by the same token it should be thin enough to easily flow around the joint in accordance with good brazing techniques.

After the flux has been applied to the joint 14, control means will actuate the air cylinder 52 to withdraw the nozzle 34 relative to the tubes 10 and 12 and with the flux operation complete the pallet holding the compressor 11 and tubes 10 and 12 may be moved down the assembly line to the brazing operation station where the heating operation takes place with the addition of the brazing alloy to complete sealing of the joint.

Control means responsive to the detector means to actuate the pump 26 and control means to actuate the air cylinder 52 to withdraw the nozzle 34 relative to the tubes 10 and 12 may be accomplished in many different ways, all of which can be easily devised by a person having ordinary skill in the art of basic control systems utilizing commercially available control components. Therefore, for the purposes of this invention it is not necessary to describe in detail any such control means or system.

While, in accordance with the Patent Statutes, there has been described what at present is considered to be the preferred apparatus of the invention, it will be obvious to those skilled in the art that various changes and modifications may be made thereto without departing from the invention.

What is claimed is:

1. Apparatus to apply brazing flux to a joint between two vertically oriented parts comprising:
   a reservoir containing liquid brazing flux,
   a pump in fluid flow communication with the reservoir, said pump having means to meter the amount of flux pumped when actuated,
   a nozzle in liquid flow communication with the pump, said nozzle having a housing with an outer casing and an inner casing spaced from the outer casing to form a passageway, said inner casing being open at one end to receive therein the parts to be joined and having two spaced apart opposing side walls with ports in each side wall in liquid flow communication with the passageway,
   means to move the nozzle and parts relative to each other to position the joint between the two parts adjacent the ports in the side walls of the inner casing, and
   means to actuate the pump and deliver a metered amount of liquid brazing flux to the joint.

2. The apparatus of claim 1 wherein there is detector means to detect the presence or absence of one of the parts to be joined and control means responsive to said detector means to prevent actuation of the pump in the event the detector means detects the absence of the part.

3. The apparatus of claim 1 wherein the two parts are stationary and the nozzle is movable relative to the parts to position the joint between the parts adjacent the ports in the side walls of the inner casing.

4. The apparatus of claim 1 wherein the reservoir has an agitator for stirring the liquid brazing flux.

5. The apparatus of claim 1 wherein the pump is a positive displacement type.

6. The apparatus of claim 1 wherein the ports in one side wall are opposite the ports in the other side wall.

7. The apparatus of claim 6 wherein the ports in the side walls are spaced a distance slightly less than the diameter of the joint between the two parts.

* * * * *